United States Patent [19]

Bunda et al.

[11] 3,922,234

[45] Nov. 25, 1975

[54] CATALYST FOR PURIFYING EXHAUST GAS BY REMOVING NITROGEN OXIDES AND A PROCESS FOR THE MANUFACTURE THEREOF

[75] Inventors: Tsuchio Bunda, Okazaki; Itaru Niimi, Nagoya; Yasuhisa Kaneko, Toyota; Katsumi Kondo, Toyota; Akiyoshi Morita, Toyota; Mototsugu Koyama, Toyota; Mitsuyoshi Sato, Toyota; Shoji Miyazaki, Toyota, all of Japan

[73] Assignee: Toyota Jidosha Kogyo Kabushiki Kaisha, Japan

[22] Filed: Apr. 2, 1973

[21] Appl. No.: 347,042

[30] Foreign Application Priority Data
Apr. 1, 1972  Japan.............................. 47-32864

[52] U.S. Cl............ 252/455 R; 252/466 J; 252/474; 423/213.5

[51] Int. Cl.$^2$. B01J 29/14; B01J 21/04; B01J 23/74
[58] Field of Search............ 252/474, 455 R, 466 J; 423/213.2, 213.5

[56] References Cited
UNITED STATES PATENTS

| | | | |
|---|---|---|---|
| 3,410,651 | 11/1968 | Brandenburg et al. | 423/213.2 |
| 3,565,574 | 2/1971 | Kearby et al. | 252/474 X |
| 3,773,894 | 11/1973 | Bernstein et al. | 252/474 X |

*Primary Examiner*—W. J. Shine
*Attorney, Agent, or Firm*—Stevens, Davis, Miller & Mosher

[57] ABSTRACT

Catalyst for purifying exhaust gas by removing nitrogen oxides, which is constituted by forming a diffused layer of copper on the surface of a metallic material of specified shape selected from a group of iron, iron alloys, nickel and nickel alloys; and its manufacturing process.

13 Claims, 5 Drawing Figures

CATALYST FOR PURIFYING EXHAUST GAS BY REMOVING NITROGEN OXIDES AND A PROCESS FOR THE MANUFACTURE THEREOF

BACKGROUND OF THE INVENTION:

The conventional industrial catalysts available for purification of auto exhaust gas include precious metal catalysts such as Pt, Pd etc. carried by alumina; oxide catalysts such as oxides mainly composed of Ni, Cu etc. being carried by a carrier or their powder being sintered; alloy catalysts mainly composed of Ni, Cu etc.; and surface-treated catalysts such as copper-plated stainless steel.

These catalysts, however, have all been found unsatisfactory for industrial purposes due to the following serious drawbacks. In the case of precious metal catalysts, for instance, the materials Pt, Pd etc. are expensive and short of supply; besides, the process of making the alumina carrier carry these metals is costly.

Problems with the oxide catalysts are such that it is relatively difficult to carry oxides on a ceramic material; they are remarkably inferior in heat resistance and durability; not only is it hard to sinter oxide powder, but also, the obtained sinterings are so low in strength as likely to be broken by vibration in use, which fact hinders the flow of exhaust gas, resulting in deterioration of the catalyst performance.

In the case of alloy catalysts, the problems are such, that the contents of Ni, Cu etc. have to be considerably high and accordingly, the material cost becomes high; also, special caution to be taken in the melting and secondary working tends to elevate the manufacturing costs; the metals Ni, Cu etc. which are to play an important role in catalysis, lack in resistance to oxidation and therefore, they are broken by vibration with progress of their oxidation, resulting in a reduced effect of catalysis.

In the case of surface-treated catalysts, the conventional surface treatment has been copper-plating or immersion in copper bath, but the products thus treated have their topmost layer made of pure copper, which exhibits a very inferior effect of catalysis. This necessitates subsequent activation treatment, which increases the cost; besides, there is no established process for this activation treatment.

SUMMARY OF THE INVENTION

The present invention relates to a catalyst which is effective for removing harmful contents, particularly nitrogen oxides, out of auto emission gases, more specifically it relates to a catalyst for purifying exhaust gas by removing nitrogen oxides therefrom, characterized by a copper-diffused layer of at least more than $5\mu$ thickness being formed on the surface of a metallic material with specified shape, of particularly, iron, iron alloy, nickel or nickel alloy; and the manufacturing process of such a catalyst.

BRIEF ACCOUNT OF THE ATTACHED DRAWINGS

FIG. 1 shows a flow sheet explaining the manufacturing process according to the present invention, FIG. 2 graphically illustrates the relation between the catalyst bed temperature and the NOx purifying rate, FIG. 3 shows a graphic example of the distribution of concentrations of diffused copper in an SPC1 catalyst according to the present invention, FIG. 4 shows a graphic example of the distribution of concentrations of diffused copper in an SUS27 catalyst according to the present invention, FIG. 5 shows a graphic example of the distribution of concentrations of diffused copper in an SUH34 catalyst according to the present invention.

DETAILED DESCRIPTION OF THE INVENTION

The present invention aims at attaining an industrial catalyst, free from the above-mentioned drawbacks of the conventional catalysts, which can purify exhaust gas by removing nitrogen oxides (denoted herein by NOx) therefrom.

With an eye set on the facts that Cu or Ni is a metal which excels in the catalytic effect of purifying NOx and the surface area of a catalyst has direct relation with catalytic reaction, the present inventors, after constant research, succeeded in perfecting the present catalyst and a manufacturing process thereof.

The diffused copper catalyst according to the present invention is entirely free from the drawbacks of the conventional catalysts and it can exhibit a superior catalytic effect in a wide range of temperatures over 400°C.

Figure 1:
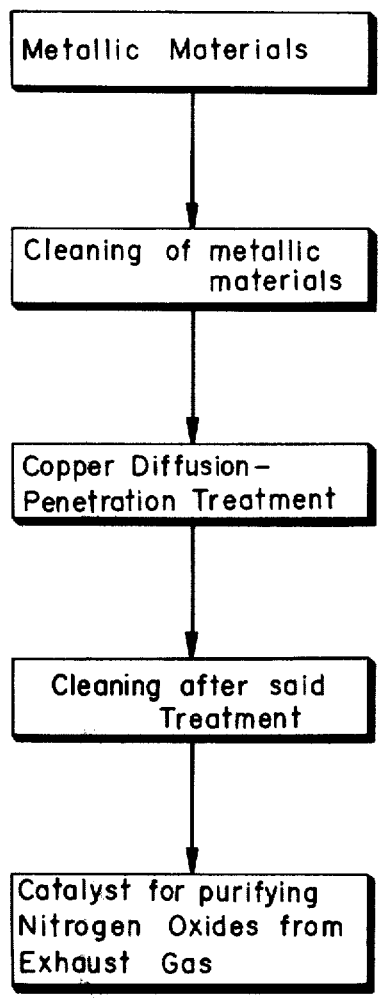

The following is a more detailed account of each step in the manufacturing process of the catalyst according to the present invention. The manufacturing process is outlined in the flow sheet of FIG. 1.

Metallic materials

The metallic materials available for the present invention include: iron, iron alloys (iron content: more than 5% by weight); nickel, nickel alloys (nickel content: more than 5% by weight). Any alloying element may be added and more specifically, the metallic materials available include: pure iron, carbon steels, low alloy steels, high alloy steels, stainless steels, heat-resistant steels; nickel, nickel alloys. These materials are submitted to copper diffusion-penetration treatment in the state of plastic-worked products such as sheet, rod, tube or wire; forgings; powder or chips; or final products such as sinterings.

Cleaning of metallic materials

For the purpose of degreasing and derusting, these materials are, depending on their surface conditions, subjected to alkaline treatment of pickling. They do not always need such a cleaning.

Copper diffusion-penetration treatment

The following methods are available for copper diffusion-penetration of the metallic material.

According to one method, the metallic material is buried in a treating composition of copper oxide and aluminum powder or magnesium powder and heated to 800° – 1100°C, thereby causing the following reduction reaction:

or

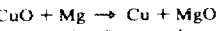

Other methods consist of a gaseous method utilizing a halogenized vapor, a powder method utilizing copper powder, and so on.

Any of the above-mentioned methods can be adopted, but experience shows that the third-mentioned method, i.e., the powder method, is the best for the manufacture of the catalyst according to the present invention.

The application of this powder method is to be described in more detail. All the percentages employed here are in weight percent.

| Treating composition | | |
|---|---|---|
| Copper powder (4 – 300 mesh) | — | 5 – 95% |
| Inert powder (4 – 300 mesh) | — | 5 – 95% |
| Halogen content | — | 0.1 – 10% |

Copper powder is not confined to one produced by the powder manufacturing process.

Alumina or kaolin are commonplace as the inert powder, but they are not the only materials available for the purpose.

Halogen content can be one or more of all halogens (F, Cl, Br, I). The chemical compounds available are, for instance, ammonium chloride, cupric bromide, magnesium iodide, etc. A copper diffusion-penetration agent can be obtained by merely blending the above-mentioned components.

Diffusion-penetration treatment

This treatment may be executed in no protective atmosphere, but presence of a protective atmosphere of argon, hydrogen, etc. would assure better results of treatment. For the purpose of treatment, the treating agent and the object to be treated are charged into a vessel and then heated in a protective atmosphere at $600° - 1100°C$ for a specified period. To be able to display a catalytic effect, the formed layer of diffused copper has to fill the following requirements. Considering the possibility of an oxidized stripping of the surface layer through repeated cycles of heating and cooling in service as the catalyst, the penetrating depth of copper should be over $5\mu$ at least; and the copper-diffused layer should contain:

| | | |
|---|---|---|
| Fe | — | 0 – 99.9% |
| Ni | — | 0 – 99.9% |
| Cu | — | 0.1 – 95% (necessary by all means) |
| Co and/or Cr | — | up to 40% permissible, since it contributes to the catalytic effect. |
| Rest | — | less than 10% |

Thus, the basic constituent of the copper-diffused layer should be Fe-Cu, Fe-Ni-Cu or Ni-Cu and the other elements should be held below 10%, except Cr and/or Co being less than 40%.

Cleaning subsequent to treatment

The major objective of this step lies in washing away the halogens deposited in the copper diffusion-penetration treatment and it is attained by using hot water or cold water of both. The catalyst according to the present invention, is produced by these steps.

The following are practical examples of executing the present invention.

EXAMPLE 1

Cold-rolled plate (1.5mm thick), chips produced in cutting rods and wire-net (wire diameter: 0.5 – 2mm; 4 – 20 mesh) of five kinds of JIS-specified metals: SPC1, SUS24, SUS27, SUS42 and SUH34 were employed. First, they were degreased in a hot alkaline bath (hot NaOH aqueous solution or hot KOH aqueous solution). Next, they were buried in a treating agent composed of 50% copper powder (100 – 150 mesh), 50% alumina powder (100 – 150 mesh) and 1% ammonium chloride relative to the total weight of Cu and Al; and heated in an argon atmosphere in an electric furnace at 900°C for 5 hours of copper diffusion-penetration treatment. Subsequently, they were put to the process of hot water flush → cold water flush → drying. It is for the purpose of preventing the hardening, when copper powder alone was used, from the same principle as sintering, that the treating agent had been added with alumina powder. Ammonium chloride content in the treating agent had the effect of promoting the penetration of copper.

The composition and thickness of diffused copper in the catalyst thus obtained, are given in Table 2, in which average values are given for diffused copper, because there was no difference between the steel plate, chips and wire-nets.

Table 1

| Materials | Composition | C | Si | Mn | P | S | Cr | Ni |
|---|---|---|---|---|---|---|---|---|
| No.1 | SPC 1 | <0.12 | — | 0.25~0.50 | 0.045 | <0.05 | — | — |
| No.2 | SUS24 | <0.12 | <0.75 | <1.00 | <0.04 | <0.03 | 16.0–18.0 | — |
| No.3 | SUS27 | <0.08 | <1.00 | <2.00 | <0.04 | <0.03 | 18.0–20.0 | 8.0–11.0 |
| No.4 | SUS42 | <0.08 | <1.50 | <2.00 | <0.04 | <0.03 | 24.0–26.0 | 19.0–22.0 |
| No.5 | SUH34 | <0.15 | <1.50 | <2.00 | <0.04 | <0.03 | 14.0–17.0 | 33.0–37.0 |

Table 2

| Materials | Thickness of copper-diffused layer ($\mu$) | Composition of copper-diffused layer (%) | | | |
|---|---|---|---|---|---|
| | | Cu | Ni | Cr | Fe |
| No.1* | 180 | 5–80 | — | — | 10–90 |
| No.2* | 140 | 2–85 | — | 0.5–2 | 10–90 |
| No.3 | 90 | 70–80 | 5–10 | 0.5–2 | 0.5–2 |
| No.4 | 100 | 70–90 | 8–15 | 0.5–2 | 0.5–2 |
| No.5 | 90 | 50–70 | 10–20 | 0.5–2 | 3–10 |

*means mixed presence of Cu and Fe in the copper-diffused layer.

EXAMPLE 2

Same metallic materials as employed in Example 1 were buried in a treating agent composed of 25% copper powder (100 – 150 mesh), 75% alumina powder (100 – 150 mesh) and 1% ammonium chloride relative to the total weight of Cu and Al; and heated in an argon atmosphere in an electric furnace at 900°C for 5 hours of copper diffusion-penetration treatment. Subsequently, they were washed and dried in the same way as in Example 1. The results are summarized in Table 3.

Table 3

| Materials | Thickness of copper-diffused layer (μ) | Composition of copper-diffused layer (%) | | | |
|---|---|---|---|---|---|
| | | Cu | Ni | Cr | Fe |
| No.1* | 130 | 5-80 | — | — | 10-90 |
| No.2 | 110 | 2-85 | — | 0.5-2 | 10-90 |
| No.3 | 70 | 70-80 | 5-10 | 0.5-2 | 0.5-2 |
| No.4 | 70 | 70-90 | 8-15 | 0.5-2 | 0.5-5 |
| No.5 | 70 | 50-70 | 10-20 | 0.5-2 | 2-10 |

*means the same as in Table 2.

EXAMPLE 3

Using the same metallic materials and the same treating agent as employed in Example 1, 5 hours of copper diffusion-penetration treatment was executed in a hydrogen atmosphere in an electric furnace at 900°C, followed by the same washing and drying as carried out in Example 1. The results are summarized in Table 4.

Table 4

| Materials | Thickness of copper-diffused layer (μ) | Composition of copper-diffused layer (%) | | | |
|---|---|---|---|---|---|
| | | Cu | Ni | Cr | Fe |
| No.1* | 30 | 2-80 | — | — | 10-90 |
| No.2 | 30 | 2-85 | — | 0.5-2 | 10-90 |
| No.3 | 30 | 70-80 | 7-10 | 0.5-2 | 0.5-2 |
| No.4 | 30 | 70-80 | 7-10 | 0.5-2 | 0.5-2 |
| No.5 | 30 | 50-70 | 10-15 | 0.2-2 | 3-10 |

*means the same as in Table 2.

EXAMPLE 4

Catalysts of Examples 1 - 3 as received without subsequent treatment, as submitted to 2 hours of oxidation at 900°C in the atmosphere, and as submitted to two hours of reduction in hydrogen gas at 800°C after 2 hours of oxidation at 900°C in the atmosphere, were subjected to a rough screening test under the following conditions to measure the NOx removing rate and thereby determine their catalytic effects.

Apparatus used: NO-removing ability tester using a circulation type mini-reactor (NO-meter employed)

Gas supplied comprises-
CO ... 1%
NO ... 1000 ppm
$O_2$ ... 0.24%
$N_2$ ... balance Rate of gas supplied: 2.75 l/min
Amount of catalyst: about 10ml (apparent surface area: 100 – 500cm²)
Spatial velocity: about 16,500 v/$r_p$/hr
Catalyst bed temperature: about 400°C The results are summarized in Table 5.

Table 5

| Materials | Copper diffusion-penetration treating conditions | Activation treating conditions | Catalyst form | NOx removing rate (%) |
|---|---|---|---|---|
| SPC 1 | Example 1 | not treated | wire-net | 43.3 |
| | Example 2 | not treated | wire-net | 48.4 |
| | Example 3 | not treated | wire-net | 40.5 |
| SUS24 | Example 1 | not treated | wire-net | 38.8 |
| | Example 2 | not treated | wire-net | 42.2 |
| | Example 3 | not treated | wire-net | 41.3 |
| SUS27 | | not treated | Sheet | 73.8 |
| | | | Chips | 78.2 |
| | | | wire-net | 79.5 |
| | Example 1 | Oxidized in the atmosphere | Sheet | 74.2 |
| | | | Chips | 85.3 |
| | | | wire-net | 81.2 |
| | | Oxidized in the atmosphere, followed by reduction with hydrogen | Sheet | 76.3 |
| | | | Chips | 73.2 |
| | | | wire-net | 80.3 |
| | | not treated | Sheet | 81.2 |
| | | | Chips | 74.3 |
| | | | wire-net | 83.6 |
| | Example 2 | Oxidized in the atmosphere | Sheet | 78.3 |
| | | | Chips | 79.6 |
| | | | wire-net | 82.4 |
| | | Oxidized in the atmosphere, followed by reduction with hydrogen | Sheet | 79.7 |
| | | | Chips | 80.2 |
| | | | wire-net | 79.9 |
| | | not treated | Sheet | 71.2 |
| | | | Chips | 73.3 |
| | | | wire-net | 70.2 |
| SUS27 | Example 3 | Oxidized in the atmosphere | Sheet | 81.3 |
| | | | Chips | 70.4 |
| | | | wire-net | 80.9 |
| | | Oxidized in the atmosphere, followed by reduction with hydrogen | Sheet | 76.2 |
| | | | Chips | 71.2 |
| | | | wire-net | 71.4 |
| SUS42 | Example 1 | not treated | wire-net | 88.9 |
| | Example 2 | Oxidized in the atmosphere | wire-net | 81.2 |
| | Example 3 | Oxidized in the atmosphere, followed by reduction with hydrogen | wire-net | 85.3 |
| SUH34 | Example 1 | not treated | wire-net | 83.4 |
| | Example 2 | Oxidized in the atmosphere | wire-net | 78.1 |
| | Example 3 | Oxidized in the atmosphere, followed by reduction with hydrogen | wire-net | 85.5 |

For the sake of comparison, a surface-treated catalyst, which represents a copper-plated SUS27 sheet; and a similar sheet, activation-treated, were measured for the NOx-removing rate under the same conditions as the above Examples, the results being summarized in Table 6; in each case of surface treatment, the thickness of copper plating was set at 20μ.

Table 6

| Activation treating conditions | NOx removing rate (%) |
|---|---|
| Non-treated | 3.8 |
| 2 hours oxidized in an atmosphere of 900°C | 10.3 |
| 2 hours hydrogen-reduced at 800°C | 13.2 |
| 3 hours diffused in a vacuum at 900°C | 10.2 |
| 3 hours diffused in an atmosphere of 900°C, followed by 2 hours of oxidation in an atmosphere of 900°C | 15.4 |
| 3 hours diffused in an atmosphere of 900°C, followed by 2 hours of hydrogen reduction at 800°C | 14.0 |
| 2 hours oxidized in the atmosphere 900°C, followed by 2 hours of hydrogen reduction at 800°C | 68.6 |

Further, for comparison, a sheet catalyst of Fe-Cu and Ni-Cu-Fe alloys and a similar catalyst activated, were measured for the NOx removing rate under the same conditions as in the above Examples, the results being summarized in Table 7.

Table 7

| Catalyst No. | Alloy composition (%) | | | Activation treating conditions | NOx removing rate (%) |
|---|---|---|---|---|---|
| | Cu | Ni | Fe | | |
| a | 4.6 | — | balance | non-treated | 7.2 |
| b | 4.6 | — | '' | Oxidation in hot air followed by reduction | 70.3 |
| c | 24.0 | 66.0 | '' | non-treated | 6.3 |
| d | 24.0 | 66.0 | '' | Oxidation in hot air followed by reduction | 73.5 |
| e | 26.4 | 52.0 | '' | non-treated | 5.3 |
| f | 26.4 | 52.0 | '' | Oxidation in hot air followed by reduction | 78.8 |

EXAMPLE 5

Figure 2:
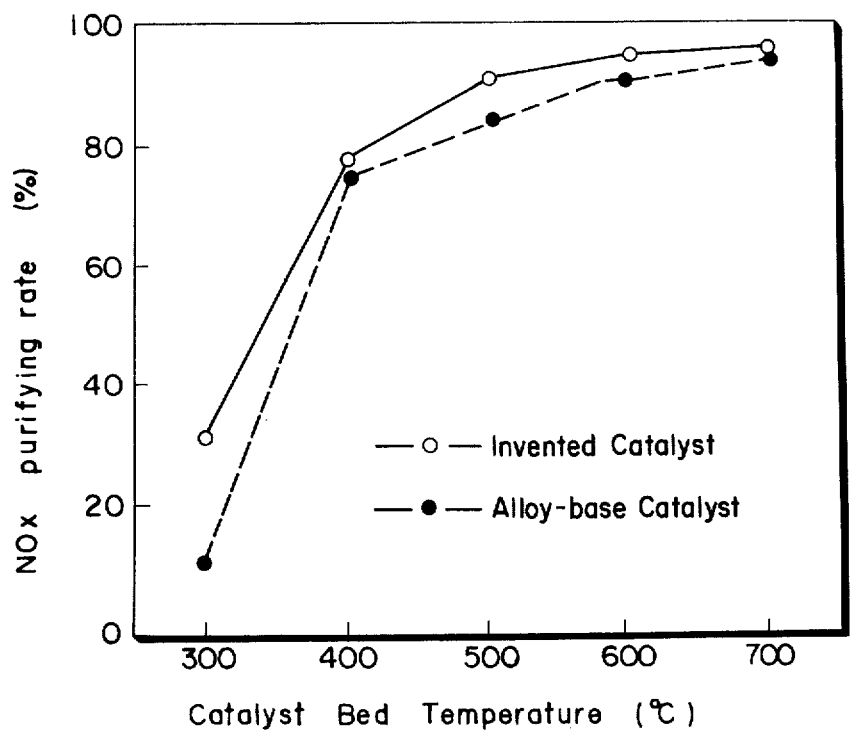

To determine the relation between the catalyst bed temperature and the NOx removing rate in the catalysts according to the present invention a comparative test under the same conditions as in Example 4 was carried out except that the catalyst bed temperature was carried out between a wire-net catalyst of SUS27 as obtained in Example 1 and a sheet catalyst No. f of Ni-Cu-Fe alloy. The NOx removing rate of each catalyst was measured with the catalyst bed temperature varied: 300°C, 400°C, 500°C, 600°C and 700°C, the results being summarized in FIG. 2. According to FIG. 2, in each catalyst compared, a rise in the catalyst bed temperature is accompanied by improvement of the NOx removing rate, but the improvement in the invented catalyst is as great as 97% at 700°C.

EXAMPLE 6

Using a wire-net catalyst of SUS27 obtained in Example 1, the ability of the invented catalyst to remove the harmful NOx out of emission gases from internal combustion engines was measured and expressed in terms of the following test conditions and the engine operation conditions of Table 8. The results are summarized in the same Table.

| Test conditions | |
|---|---|
| (1) Engine | 1900cc 4-cylinder reciprocating gasoline engine |
| (2) Volume of catalyst | apparent surface area: 13,000 cm² |
| (3) Catalyst converter | inside diameter: 71 mm length : 300 mm capacity : 1.2l |

The above-mentioned catalyst was charged into a catalyst converter, which was then installed 250mm below the exhaust manifold.

Table 8

| Engine operation conditions | | NOx removing rate(%) |
|---|---|---|
| Engine revolution: | 2,700 r.p.m. | |
| Engine load: | 2.2 kg-m | |
| Spatial velocity: | 40,000 v/$_{rp}$/hr | |
| Average gas concentrations: | | 48.3 |
| NO: | 1,200 p.p.m. | |
| CO: | 3.8% | |
| HC: | 160 p.p.m. | |
| C: | 12% | |
| Engine revolution: | 2,500 r.p.m. | |
| Engine load: | 1.2 kg-m | |
| Spatial velocity: | 27,000 v/$_{rp}$/hr | |
| Average gas concentrations: | | 92.4 |
| NO: | 600 p.p.m. | |
| CO: | 4.6% | |
| HC: | 170 p.p.m. | |
| CO$_2$: | 11.5% | |

EXAMPLE 7

To measure the weight changes due to heating of the invented catalyst in the atmosphere, a sheet catalyst of SUS27 as obtained by the method of Example 1 (50mm × 35mm, surface area 39.89 cm²) was heated at 600°C and 700°C in the atmosphere from 50 – 400 hours. The results are summarized in Table 9. In the same test, the amount of stripping was measured, but no stripping could be observed.

Further, to determine the NOx removing ability of the invented catalyst after heat treatment, a test was carried out under the same conditions as in Example 4, the results being given in the same Table, from which it is known that even after 400 hours of heating at 600°C and 700°C, no deterioration takes place of the purifying ability of the invented catalyst.

Table 9

| Heating temperature | Weight loss (mg/cm²) | | | | NOx revoving rate after 400 hrs. of heating(%) |
|---|---|---|---|---|---|
| | 50 hrs. later | 100 hrs. later | 200 hrs. later | 400 hrs. later | |
| 600°C | 6.67 | 6.75 | 9.68 | 12.60 | 81.3 |
| 700°C | 11.26 | 14.78 | 17.26 | 17.06 | 79.7 |

The above Examples testify that the invented catalyst makes an excellent means for reducing NOx contained in the emission gases, particularly from internal combustion engines.

A detailed analysis of the results of the above Examples is to be made here.

Figure 3:
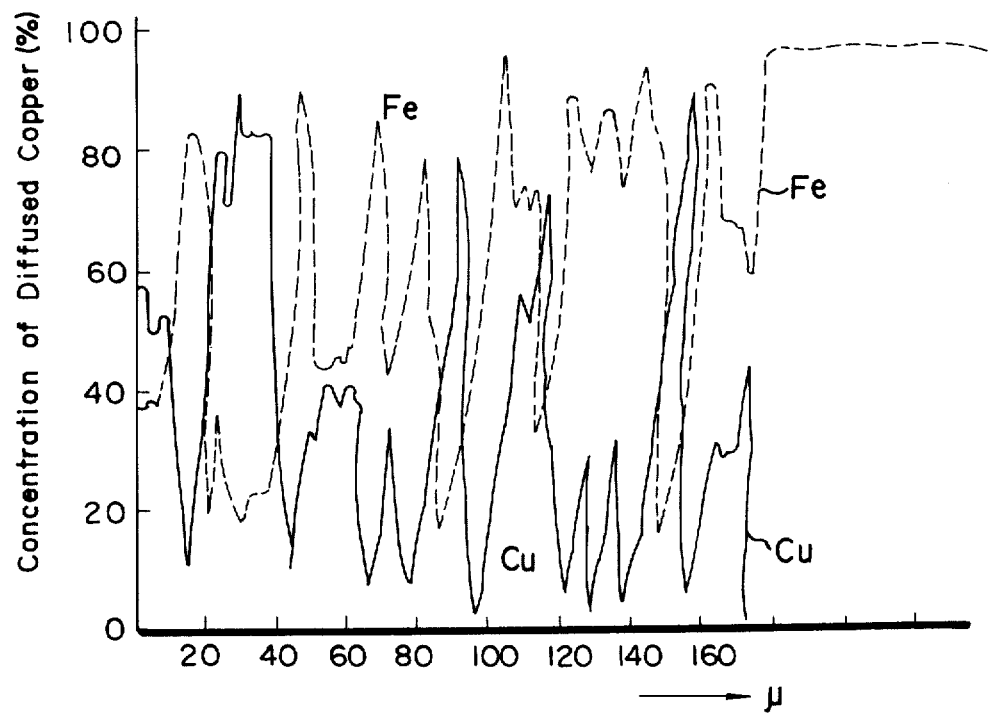

As evident from Examples 1 – 3, the copper-diffused layer of a catalyst according to the present invention using a low carbon steel or a chrome steel as the metallic material represents a mixed layer of Cu and Fe, with Cr practically absent or very little, if present; this is apparent from the distribution of copper concentrations in the diffused layer of the catalyst using SPC 1 as the metallic material which has been submitted to copper diffusion-penetration treatment, the distribution being illustrated in FIG. 3.

Figure 4:
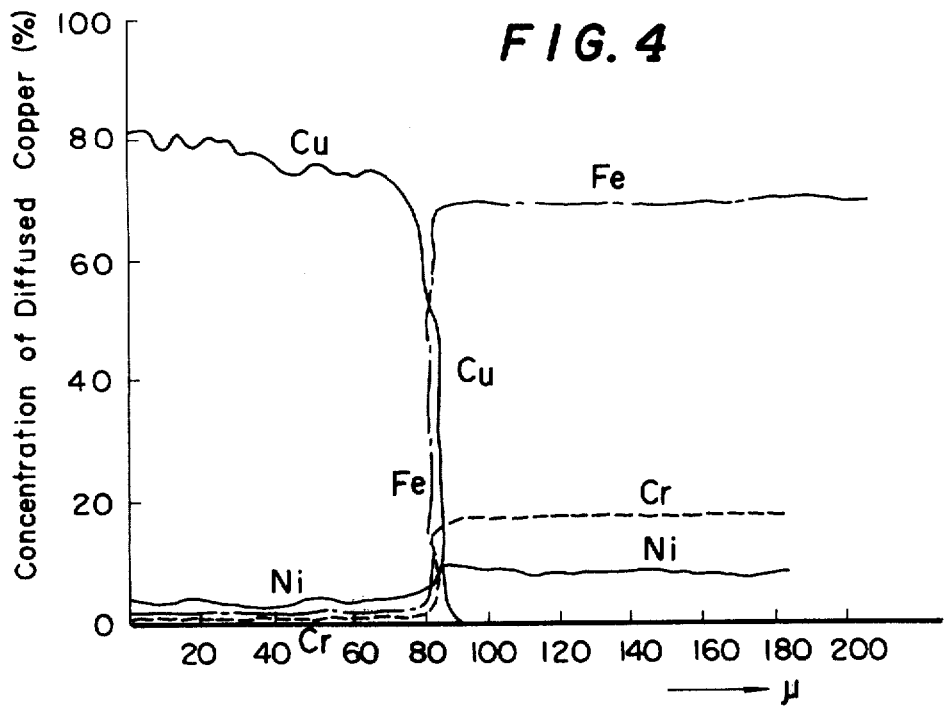
Figure 5:
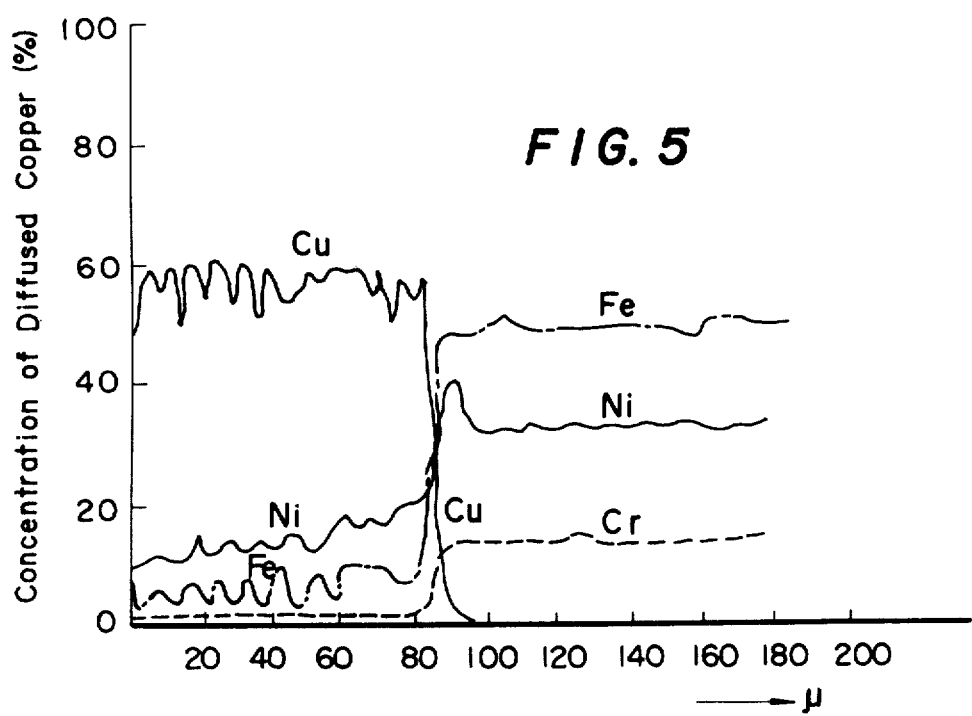

In the case of using nickel steels, e.g., SUS27, SUH34 or SUS42 as the metallic material, the copper-diffused layer represents a solid phase of Cu-Ni-(Fe); in this case, the greater the nickel content of the material, the greater become the contents of nickel and iron in the copper-diffused layer with the smaller content of copper. This is apparent from the distribution of copper concentrations in the diffused layer of a catalyst using SUS27 or SUH34 as the metallic material which has been submitted to copper diffusion-penetration treatment, the distributions being illustrated in FIGS. 4 and 5.

From the above, it is easy to infer that through adequate selection of the chemical composition of the metallic material and the conditions of copper diffusion-penetration treatment, copper-diffused layers with a wide range of chemical compositions and thicknesses can be formed on the metallic material.

As seen from Examples 4, 5 and 6 (Tables 5, 7 and FIG. 2), the catalytic effect of a catalyst according to the present invention is equal to or better than that of one using Cu-Ni-(Fe) alloy as the metallic material (which has been submitted to activation treatment) with a corresponding composition of the copper-diffused layer. This is natural in view of the fact that the chemical composition of the copper-diffused layer in the catalyst according to the present invention nearly corresponds to that of the alloy and this is also suggested by the fact that in Table 5, the catalytic effect remains the same in spite of the catalyst being different in form.

As revealed by the comparative test of Example 4 (Tables 5, 6 and 7), surface-treated catalyst and alloy catalyst as received after copper plating, show a very low catalytic effect; they can exhibit a remarkable catalytic effect only after being submitted to activation treatment. By contrast, the catalyst according to the present invention shows a good catalytic effect even without activation treatment and this effect remains practically the same even after such treatment. This fact leads to the speculation that there must be a certain difference other than in the chemical composition between the surfaces of a copper-plated surface-treated catalyst, a similar catalyst activated; a copper-plated alloy catalyst and a catalyst according to the present invention. Cause of this difference cannot be clarified, but it may be surmised that through copper diffusion-penetration treatment, the surface structure of the metallic material in the catalyst according to the present invention is reoriented and activated due to the copper being diffused from outside and penetrating in depth.

As evident from Example 7, according to the present invention, use of a metallic material which is highly resistant to oxidation makes it possible to obtain a copper-diffused layer that does not strip off even under severe conditions of service, probably because the metallic material is resistant to oxidation and accordingly, even if the copper-diffused layer becomes oxidized easily, the oxide is not formed in depth under the surface; and the copper-diffused layer is formed in such a network along the crystalline boundary of the metallic material, that it does not strip off easily.

To sum up the advantages of the catalyst according to the present invention, whose excellence as an industrial catalyst for removal of NOx has been described with reference to the above examples:

1. Depending on the metallic material and the conditions of copper diffusion-penetration treatment, the surface composition of the catalyst can be selected over a wide range.

2. The production cost is low, because the copper-diffused layer is formed only on the surface of the metallic material.

3. Through adoption of an anti-oxidizing metallic material the anti-oxidation and anti-stripping properties of the catalyst itself can be improved, resulting in a long persistence of the catalytic effect.

4. The form of the metallic material can be selected over a wide range.

5. Copper-plated surface-treated catalysts and alloy catalysts, when not activation-treated, can hardly be expected to show any catalytic effect; they can be effective only after activation-treated. By contrast, the catalyst according to the present invention shows a catalytic effect just as copper diffusion-treated.

6. The catalytic effect of the catalyst according to the present invention is not affected at all by oxidation or reduction.

These features render the catalyst according to the present invention useful as an exhaust gas-purifying catalyst for internal combustion engines.

What is claimed is:

1. A catalyst for purifying automotive exhaust gas by removing nitrogen oxides therefrom, which is obtained by forming a copper-diffused layer on the surface of a metallic material molded into a desirable shape which is selected from a group of iron, iron alloys, nickel, nickel alloys by burying the molded metallic material in a diffusion-penetration treating agent composed of copper powder, inert powder and halogen compound; and heating this material in a protective atmosphere, whereby a copper-diffused layer is formed on the surface of said metallic material.

2. A catalyst of claim 1, wherein said metallic material is iron or an iron alloy with an iron content of more than 5% by weight.

3. A catalyst of claim 1, wherein said metallic material is nickel or a nickel alloy with a nickel content of more than 0.5% by weight.

4. A catalyst of claim 1, wherein the surface of said metallic material has a copper-diffused layer of at least over $5\mu$ thickness.

5. A catalyst of claim 1, wherein the copper-diffused layer on the surface of the metallic material has been subjected to an activation treatment.

6. A process of manufacturing a catalyst for purifying automotive exhaust gas by removing nitrogen oxides therefrom, comprising the following steps:

molding into a desirable shape a metallic material selected from a group of iron, iron alloys, nickel, nickel alloys;

burying said molded metallic material in a diffusion-penetration treating agent composed of copper powder, inert powder and halogen compound; and heating the above in a protective atmosphere, to form a copper-diffused layer on the surface of said metallic material.

7. A process of manufacturing a catalyst of claim 6, whose metallic material is iron or an iron alloy with an iron content of more than 5% by weight.

8. A process of manufacturing a catalyst of claim 6, whose metallic material is nickel or a nickel alloy with a nickel content of more than 0.5% weight.

9. A process of manufacturing a catalyst of claim 6, wherein said inert powder is alumina of kaolin.

10. A process of manufacturing a catalyst of claim 6, wherein the halogen compound is furnished by ammonium chloride.

11. A process of manufacturing a catalyst of claim 6, wherein said protective atmosphere is constituted by argon gas or hydrogen.

12. A process of manufacturing a catalyst of claim 6, wherein said metallic material buried in the diffusion-penetration treating agent is heated at about 600° – 1100°C.

13. A process of manufacturing a catalyst of claim 6, wherein said copper-diffused layer is heated in hydrogen gas to subject said catalyst to an activation treatment.

* * * * *